Dec. 22, 1925.                                             1,566,378
J. F. DEFORDT
FREE WHEEL CLUTCH
Original Filed March 21, 1921

Patented Dec. 22, 1925.

1,566,378

UNITED STATES PATENT OFFICE.

JULES FREDERIC DEFORDT, OF IXELLES, BRUSSELS, BELGIUM.

FREE-WHEEL CLUTCH.

Original application filed March 21, 1921, Serial No. 454,191. Divided and this application filed June 20, 1922. Serial No. 569,767.

*To all whom it may concern:*

Be it known that I, JULES FREDERIC DEFORDT, a subject of the King of Belgium, and resident of Ixelles, Brussels, Belgium, have invented certain new and useful Improvements in Free-Wheel Clutches, for which I have filed applications for patents in Great Britain, No. 173,720, dated February 2, 1921; Holland, No. 21,216 filed January 16, 1922; and Germany, No. D.39,251, filed April 24, 1922, and of which the following is a specification.

This invention relates to free wheel clutches of the positive type comprising two concentric wheel members and a plurality of interposed radially movable members which are adapted to form a positive driving connection between the two wheel members when such wheel members are moved in the fixed wheel direction and to permit of free relative movement between such wheel members when the same are moved in the free wheel direction.

The object of the present invention is to provide a free wheel clutch of the mentioned type by means of which large forces may be transmitted.

The present invention consists broadly of a positive free wheel clutch which comprises a pair of concentric wheel members one of which is provided with a plurality of radial pockets in each of which is slidably mounted a movable tooth whilst the other member is provided with a plurality of teeth of substantially buttress form with which the movable teeth are adapted to engage and by which they are moved in one direction and means for positively moving said teeth in the other direction.

In a positive free wheel clutch according to one form of the invention the radial pockets are formed in the inner periphery of the outer wheel member and such pockets, also the movable teeth, extend substantially the full width of the wheel member whilst the buttress teeth are formed around the outer periphery of the inner wheel member.

A further feature of the invention resides in the provision of means such as opposing spring pressed balls or the like in the pockets which tend to force such movable teeth out of their pockets and into the engaging position.

A still further feature of the invention resides in providing a difference in numbers between the movable teeth and the buttress teeth whereby one at least of such movable teeth is always substantially in a position where it can move into engagement with a buttress tooth.

This application is a division of my co-pending application filed March 21, 1921, Serial No. 454,191.

In order that the invention may be clearly understood an embodiment of the same will now be described by aid of the accompanying drawings in which:—

Figure 1:
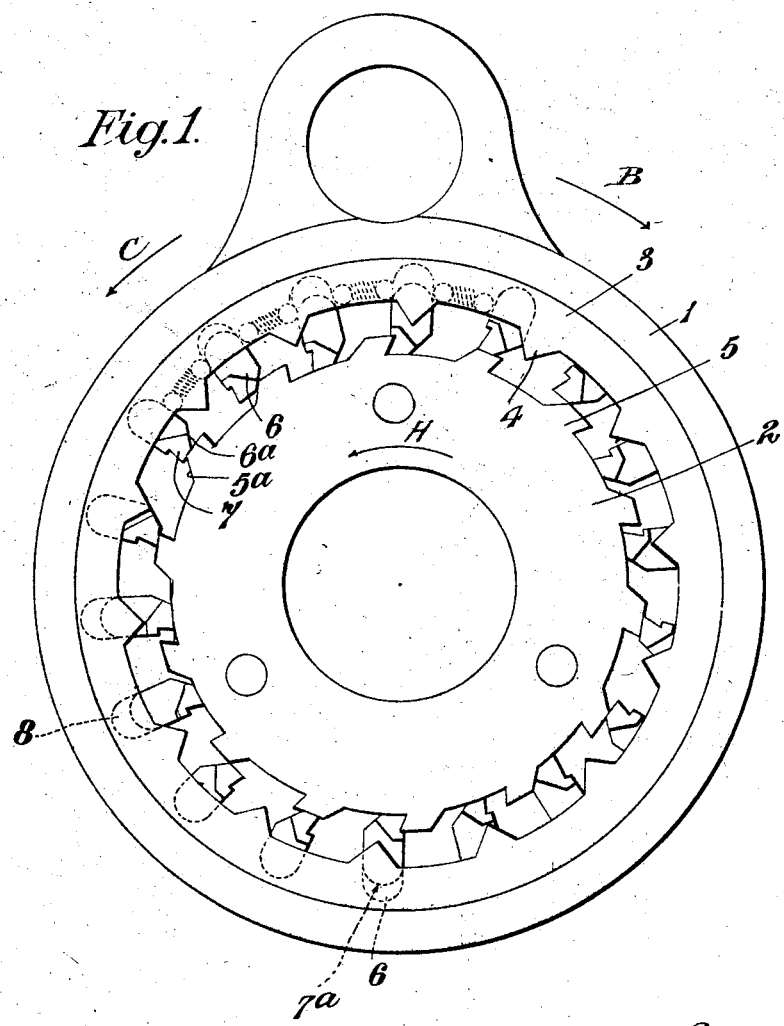
Figure 1 is a side elevation of the same with one of the side covers removed.
Figure 2:
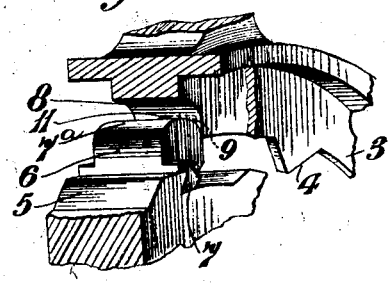
Figure 2 is a fragmentary perspective view of the same to an enlarged scale.
Figure 3:
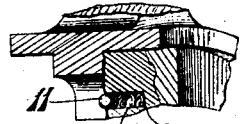
Figure 3 is a similar view illustrating the means employed for normally retaining the radially movable members in their outermost positions relatively to their pockets.

In the form of the invention illustrated in the drawings the movable tooth members on one wheel member are adapted to be positively moved into position for engagement with the teeth on the other wheel member by means operable in response to relative movement between the two said members. This is effected by providing, in rigid relationship with the inner wheel member 2 by connecting pieces which are however not shown in the drawings, two annular members 3 concentric with both wheels and flanking the larger wheel 1. These annular members are provided on their inner peripheries with equally spaced triangular projections 4 to a number equal to the number of teeth 5 on the smaller member. The movable teeth 6 at or near their inner ends have lateral projections 7 one on each side, which lateral projections are adapted to engage with the triangular projections 4 on the annular members in such a manner that when the device is operated in the free wheel direction, the said triangular projections act as cams to press each movable tooth 6 back into the path of the fixed teeth immediately it has passed a fixed tooth so that as soon as the device is operated in the fixed wheel direction the teeth will be in position to engage.

In order that at least one pair of teeth will be in immediate position to engage, said movable and fixed teeth are made different in number. In the embodiment under consideration for instance, I provide four more movable teeth than fixed teeth and consequently the teeth on each member being equally spaced there are always two diametrically opposite pairs of teeth in position for almost instant engagement immediately the device is operated in the fixed wheel direction.

In accordance with the well known principle in free-wheel clutches the surfaces of the fixed teeth 5 and movable teeth 6 are inclined where they are adapted to come into contact with each other as at 5ª and 6ª respectively, so that the latter will be moved outwardly to clear the former when the device is operated in the free wheel direction. When the device is operated in the fixed wheel direction these teeth will lock with each other. The apices of both sets of teeth are made flat so that each can pass easily over the other in the free-wheel direction.

The outer ends of the movable teeth 6 are curved or made semi-cylindrical or semi-spherical as indicated at 7ª and such ends freely slide within radial holes 8 in the outer member 1. Each of these radial holes is provided near its upper end with opposing circumferential passages 9 in each of which is placed a spring 10 adapted to press two small metal balls 11 outwardly against each movable tooth. The result is that when each movable tooth is thrown to its outermost position, or the position in which it is clear of the fixed teeth, such means tend to force it back again into the position where it will engage with the fixed teeth.

By this means I not only prevent rattling and noise but also prevent the movable teeth flying outwards by centrifugal force or by gravity.

In operation the outer wheel member 1 is rocked backwards and forwards. This causes the inner member 2 to rotate in the direction of the arrow A in Fig. 1. As the outer wheel member is rocked it is moved in two directions indicated in Fig. 1 by the arrows B and C respectively. When this wheel member is moved in the direction B or free wheel direction the inclined rear faces of the movable teeth engage the adjacent inclined faces 5ª of the fixed teeth with the result that the movable teeth ride up the faces 5ª and so over the fixed teeth. Immediately after a movable tooth has ridden over a fixed tooth the lateral pieces 7 are engaged by the triangular projections on the annular members 3 which are moving in the direction of the arrow A. The movable teeth are thus forced positively back into engagement with the fixed teeth. When the outer wheel member 1 is moved in the direction of the arrow C or fixed wheel direction the movable teeth engage under the fixed teeth and so provide a positive forward drive until such time as the outer wheel member has completed its stroke in the direction of the arrow C when it moves back again in the direction of the arrow B.

What I claim and desire to secure by Letters Patent is:—

A positive free wheel clutch comprising a pair of concentric wheel members, a plurality of radial pockets in one of said wheel members, a movable tooth slidably mounted in each of said pockets, a plurality of fixed teeth of substantially buttress form on the other wheel member with which the movable teeth are adapted to engage when the wheel members are moved in the fixed wheel direction and by which the movable teeth are moved radially within their pockets in one direction when the wheel members are moved in the free wheel direction, lateral projections on opposite sides of the movable teeth having inclined surfaces, annular members concentric with the wheel members and movable with the wheel member having the fixed teeth, said annular members having spaced triangular projections adapted to engage the inclined surfaces on the lateral projections of the movable teeth and positively move such teeth radially into the engaging position when the wheel members are moved in the free wheel direction.

In witness whereof I affix my signature.

JULES FREDERIC DEFORDT.